United States Patent Office 2,805,989
Patented Sept. 10, 1957

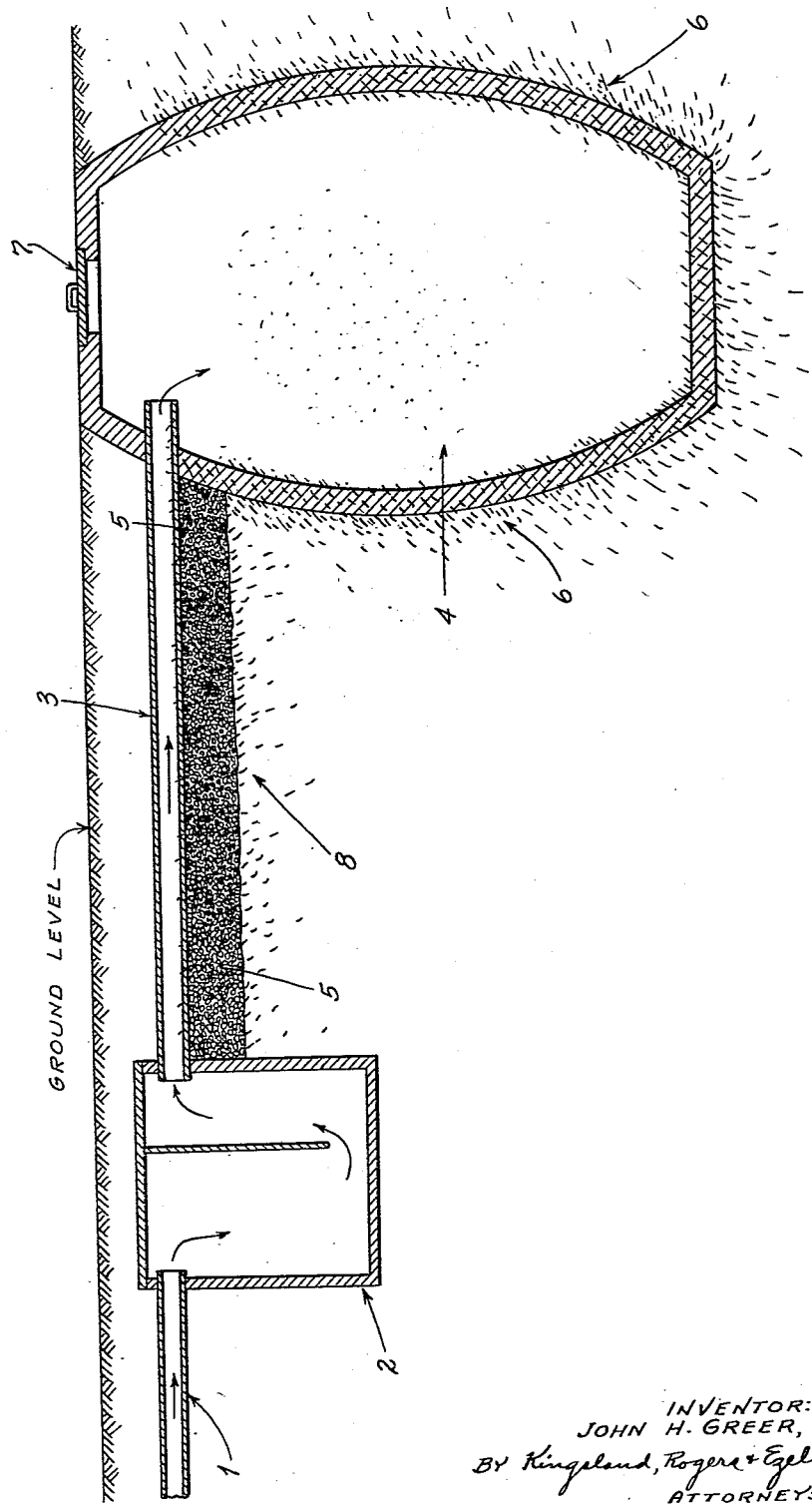

2,805,989

PROCESS AND COMPOSITION FOR INCREASING RATE OF FLOW IN SEWAGE UNITS

John H. Greer, Quincy, Ill., assignor to Louise P. Greer, Quincy, Ill.

Application June 14, 1954, Serial No. 436,651

5 Claims. (Cl. 210—58)

This invention relates to improvements in a method and composition for conditioning domestic sewage units, and in particular is concerned with the treatment of domestic sewage units including any one or all of a septic tank, laterals and cesspool. Such domestic sewage units are conventionally used on farms and in rural communities wherein a centralized sewage disposal system is not available, and are to be found not only on farms but in motels, vacation resorts, or installations in various other places.

In the past, a particular problem which has been present in such domestic sewage units has been the difficulty caused by clogging up of the septic tank, cesspool or laterals used in these installations. This clogging up may be caused in a number of ways, such as by blocking of the pores in the surrounding soil, or in the porous masonry of the walls of the sewage unit. This clogging may be caused by filtering out the lime and magnesium soaps which are formed when hard water is used high in calcium and magnesium compounds. Also, grease and organic matter of animal and vegetable origin may cause accumulation in the soil surrounding the laterals and the cesspool and form a barrier through which sewage water from the sewage unit cannot penetrate. Thus, the areas surrounding the laterals and the cesspool may be substantially entirely clogged and barred as far as free percolation of the sewage water is concerned by such accumulations which will effectively prevent any satisfactory operation of the sewage unit.

By means of this invention, there has been devised a method and a composition for treatment of such sewage units which enable the lime and magnesium soaps and grease or other organic matter to be dissolved within the laterals and cesspool and the surrounding earth drainage area. In short, a wetting agent and detergent are used which may be introduced directly into the waste disposal unit such as the cesspool, or into the drains of the house, dwelling or other building from which the sewage is to be removed. This agent reduces the surface tension within the sewage unit so as to allow a more satisfactory flow, and also dissolves the objectionable solid matter.

The wetting agent finds its way, by its ability to reduce the surface tension, into the surrounding area exteriorly of the cesspool or laterals, and flows through the surrounding earth much more easily and rapidly than would pure water, much less the viscous polluted water which is to be removed. The agent by its detergent quality has an affinity for grease and other organic animal or vegetable matter, which may be accumulated within the pores of the surrounding soil, and by dissolving the same and reducing the surface tension allows a very ready subsequent passage of sewage water therethrough after this matter has been cleared from the soil. In addition, various phosphates, including polyphosphates and pyrophosphates, can be used in addition to the wetting agent, and such phosphates by their detergent qualities and ability to retain calcium and magnesium ions in solution increase the beneficial results.

It is the combined action of the agent as a solvent for the lime and magnesium soaps and also for the grease and other organic matter that is of particular value in this invention, which is especially applicable for use in areas using hard water. Such areas in the past have been notably difficult to provide for proper sewage disposal by the domestic sewage units herein treated. By means of this invention, the sewage unit and the surrounding soil area are conditioned for a very substantial period of time, which may be in the order of about a year for the normal application. Further, the effective soil drainage and percolation area around the cesspool and laterals is increased more than three-fold of that which was previously applicable. This is because the surface tension is reduced within the moisture of the soil itself by the application of a wetting agent. As a result, the percolation of waste liquid therethrough is greatly enhanced, and the waste liquid can travel a great deal further from the cesspool in draining therefrom than was formerly possible.

Accordingly, it is an object of this invention to provide a method and composition for treating domestic sewage units by adding an agent thereto which reduces the surface tension and allows sewage removal to be greatly facilitated.

It is a further object of this invention to provide a method and composition for use in domestic sewage units whereby, by the addition of an agent to the septic tank, lateral or cesspool, the insoluble lime and magnesium soaps and matter of organic origin can be dissolved to enhance the removal of waste liquid.

It is a further object of this invention to provide a method for adding an agent to a domestic sewage unit to dissolve lime and magnesium soaps and solid organic matter which bar the porous passages in the walls of the sewage unit and the surrounding soil area.

It is still another object of this invention to provide a method for adding an agent to a sewage unit within the drains, septic tank, laterals or cesspools whereby solid organic matter which bars the porous passages and the surrounding soil and walls of the sewage unit is dissolved, the surface tension of the liquid is decreased within the unit and surrounding area to facilitate drainage to an increased ground area surrounding the unit.

Other objects will appear in the description below.

This invention is applicable to any domestic sewage unit, as will be understood from a further description of this invention, and as related above. For the purposes of illustration, reference is had to the accompanying drawing showing a conventional domestic sewage unit. This sewage unit is of a type that may be used in any farm building or other rural installation not having the benefit of a city sewage disposal service.

In this sewage unit shown in the accompanying drawing, the waste disposal drain from a building is indicated at 1 and is introduced beneath the ground level to a septic tank 2. From the septic tank 2 a porous tile pipe 3 leads to the cesspool 4. The lateral 3 is underlaid with crushed rock 5 that provides for proper drainage therethrough on the way to the cesspool. As the sewage unit is employed, accumulation of lime and magnesium soaps, due to lime and magnesium compounds in the water (utilized if hard water is employed), and organic matter which may be grease, fatty matter or other accumulation, will build up in the regions indicated at 6 and 8 around the cesspool and beneath the laterals, respectively.

When this build-up occurs, the waste disposal is substantially cut down since the liquid in the waste will not filter through this accumulated barrier. Actually, the barrier 6 extends to a lesser concentrated degree to the surrounding soil around the cesspool and lateral much more extensively than shown just adjacent the walls of the sewage unit. Due to this blocking in the surrounding area, the percolation and disposal are greatly reduced. Thus, the capacity of the sewage unit is impaired and eventually will clog up completely as the accumulation grows.

By means of this invention, an agent is introduced directly into the cesspool 4 through a cover plate 7. At the same time, a minor proportion of the agent may be introduced into the drain leading down to the inlet 1 so that there is a combined action throughout the entire sewage unit. The particular agent desired to be used for hard waters will be one which can dissolve the lime and magnesium soap, have an affinity for grease and fatty organic substances to dissolve the same, and act as a wetting agent to reduce the surface tension of the liquid. Thus, there is a three-way action. For waters in which the formulation of lime and magnesium soaps is not a problem, any agent may be used which is a wetting agent and has an affinity for grease and fatty matter to dissolve the same.

The particular agent to be used must be carefully chosen so that it does not destroy the basteria which are present in the cesspool and act to break down solid organic matter therein. It is desired that this agent have a pH of slightly less than 7 in solution, since conventionally the organic material within the cesspool will be acid in nature and no counteraction by the addition of the agent will be desired, and actually is to be avoided. Further, when this agent percolates into the adjacent and surrounding soil, it is desired that no chemical action be effected. Quite conventionally, the surrounding soil is alkaline in nature, although in some cases it is acid, but for this reason it is additionally to be desired that the agent be almost neutral or slightly on the acid side in characteristic.

The agent to be used should not only be stable in acid and alkaline solutions and have no effect on bacteria, but should also be adapted to be very easily dissolved in the waste liquid. For this reason, it is preferred that the agent be in powder or bead form, since such physical formulation will make dissolving of the agent in the liquid very fast and effective. Flake form may also be used as well as paste or liquid where storage or shipping problems are not prohibitive.

In general, any agent which acts as a wetting agent and detergent may be used to dissolve the grease, fatty material and other organic matter in water where hardness is not a problem. These materials will not only act in dissolving the objectionable organic matter, but will also reduce the surface tension of the liquid. Thereby, a dual effect is accomplished in dissolving the accumulated matter that clogs the pores of the walls and also the pores in the surrounding soil, and also the liquid within the sewage unit has its surface tension reduced so that its flow passage through the pores is greatly facilitated.

For the purpose of this invention, in dissolving the organic matter and reducing the surface tension, and meeting the other requirements enumerated above, an agent that is both a wetting agent and detergent may be used which is either anionic or nonionic. As examples of chemical compounds within such a classification are alkyl aryl sulfonate and alkyl aryl sodium sulfonate, both of which are anionic. Commercial examples of such compounds are Nacconol NR and Nacconol Z, respectively, for alkyl aryl sulfonate and alkyl aryl sodium sulfonate, both made by National Division of Allied Chemical and Dye Corporation.

As an example of the nonionic surface active agent which can be utilized, the Pluronics manufactured by Wyandotte Chemical Corporation are of advantageous employment. These may be Pluronics L44, L62 and L64 which are liquid products, and F68 which is a flake product, all of which are long chain high molecular weight products formed by condensing ethylene oxide on a polyoxypropylene base. The molecular weight of these compounds varies respectively in the order given from 2,000 up to 8,000.

Other anionic and nonionic surface active agents which act both as wetting agents and detergents can be utilized in this process to dissolve grease, fatty material and other organic solids, and thereby reduce the surface tension and remove the accumulated barrier from the pores of the sewage unit and surrounding soil. For instance, a lauryl sodium sulfate which is anionic, such as Duponol ME dry manufactured in powder form by E. I. du Pont de Nemours & Co., may be employed. These agents must have an affinity, however, as brought out above, both for water and for organic matter, and they are, therefore, required to be both hydrophilic and lyophilic. They must also be chosen for their stability in acid and alkali, have a neutral pH, and have no adverse effect upon the bacteria which are generated within the sewage unit to break down the sewage therein.

Where hard water is utilized in the building to be serviced by the sewage unit, lime and magnesium soaps will form as a result of lime and magnesium compounds within the hard water. As has been brought out above, this causes accumulation of the soap matter on the walls of the sewage unit and within the pores of the soil which, together with the grease and other organic matter, will serve to block the waste flow therethrough. Where this problem is encountered, as is the case in most parts of the country where hardness in water is present to some degree, the agent should be chosen, in addition to the above required features, also for its dissolving effect on said lime and magnesium soaps. In such a situation, it has been found that alkyl aryl sulfonate and alkyl aryl sodium sulfonate, which may be the Nacconol NR and the Nacconol Z surface active agent manufactured by National Aniline Division of Allied Chemical and Dye Corporation, and which have combined detergent and wetting activities, may be utilized. These compounds have been tested and have been found to work exceedingly well in such cases, and have cleared up completely clogged sewage units in one application.

To illustrate the application of this invention, an example will be given for a 750 gallon cesspool of the type shown in the drawing. After the lateral and cesspool of this drawing have been clogged such that under normal conditions it would have been required to be manually cleaned and pumped out, 15 pounds of Nacconol NR is added directly to the cesspool through the cover plate 7. Preferably, at the same time, 15 pounds is put in a drain of the building to be serviced wherein the drain eventually leads to drain 1 and the septic tank 2. The agent added to the drains eventually works its way into and through the lateral 3, and reduces the surface tension therein down to the crushed rock 5 and to the barrier 8 which directly underlies the crushed rock. The agent there acts to dissolve out the barrier of accumulated solids including the soaps and organic matter. The amount added to the cesspool is about one-quarter of one percent by weight of the liquid capacity therein, which makes about one-half of one percent with the material added to the drains. It is found that this concentration is sufficient to clear up the barrier accumulation of lime and magnesium soap, grease, fatty matter and other organic substances which clog the pores therein and prevent free waste flow of the liquid to be disposed of.

If desired, and particularly where objectionable hard waters are present, phosphates such as trisodium phosphate, sodium hexametaphosphate, sodium pyrophosphate and sodium polyphosphate can be used with the agent. When trisodium phosphate is used, an amount of 30 percent tripolyphosphate based on the amount of trisodium phosphate used, must be added to keep the trisodium phosphate from forming an insoluble P. P. T. with hard water. These phosphates form soluble complexes with the lime, magnesium, iron and aluminum ions, and thereby inhibit the formation of objectionable insoluble soaps and solid compounds. The phosphates also have a good solvent action on the grease and other fatty substances.

These phosphates may be used in place of part of the wetting agent in the amount of up to 20 percent of the wetting agent, or in addition thereto in amounts up to 20 percent.

After treatment, the accumulated matter in the pores of the walls of the sewage unit and in the surrounding soil will be quickly worked out and the capacity of the sewage unit will be restored to normal and actually increased two or three-fold over that of normal capacity. The increase in capacity is accomplished by the effective creation of a drainage area two to three times the normal area in the soil surrounding the laterals and the cesspool. This is brought about because the agent through its wetting capacity has worked through this material and, by reducing the surface tension of the moisture normally inherent in the soil and from the liquid percolating through the waste disposal unit, has greatly facilitated the passage of said liquid therethrough. Accordingly, a greater supply of waste sewage can be handled in any given time through the unit compared to what could have been handled before, and larger quantities of waste water can, therefore, be disposed of.

Other materials having the qualities of wetting agents, and detergents which have the required surface active features and chemical properties as outlined above, can be utilized in the process of this invention. A very large number of such surface active agents are presently known and are conveniently available for application in this invention which is of extremely wide utility in increasing the effective waste flow in the sewage units above described. The application of the agent in very small quantities in the order of one-quarter to one-half of one percent, which may be varied depending upon the application, is effective in greatly increasing the flow of waste material through the sewage unit after it has been clogged and rendered almost useless. After treatment with the agent, the effective period of time before another treatment is required under normal application will be in the order of about a year, or correspondingly less if the phosphate is used in addition, but should the service be exceptionally high or a very hard water be encountered, which would form lime and magnesium soaps in a high degree, a subsequent treatment through the drain, such as that disclosed in the example, can be practiced to keep the flow clear. For the example disclosed where service is heavy, a reinforcing treatment through the drain could take form by addition of one pound of the agent at a two-week interval.

Various other modifications of this invention will appear from the description above and will be apparent to those skilled in the art, and it is desired that these teachings be included within the scope of this invention, as defined in the claims appended hereto.

What is claimed is:

1. A process for facilitating waste liquid flow in a sewage unit comprising at least one of a septic tank, lateral and cesspool disposed in the ground for drainage flow of said liquid through permeable walls in said unit, wherein drainage flow is impeded by the accumulation of solid waste matter including lime and magnesium soaps and organic matter including grease, fats and substances of animal and vegetable origin within said sewage unit and within the porous soil surrounding the unit, which comprises adding to said sewage unit a composition to reduce the surface tension of said waste liquid and increase its drainage rate through said permeable walls and the porous soil surrounding the same, said composition comprising; a wetting agent having a substantially neutral pH and inertness to bacteria; and a phosphate having the capacity to dissolve said soaps and said organic matter, and said phosphate being present in an amount up to about 20% of the wetting agent; and said composition being added in the amount of up to about one-half of 1% of the liquid in the sewage unit.

2. A process for facilitating waste liquid flow in a sewage unit comprising at least one of a septic tank, lateral and cesspool disposed in the ground for drainage flow of said liquid through permeable walls in said unit, wherein drainage flow is impeded by the accumulation of solid waste matter including lime and magnesium soaps and organic matter including grease, fats and substances of animal and vegetable origin within said sewage unit and within the porous soil surrounding the unit, which comprises adding to said sewage unit a composition to reduce the surface tension of said waste liquid and increase its drainage rate through said permeable walls and the porous soil surrounding the same, said composition comprising; a wetting agent having a substantially neutral pH and inertness to bacteria, said wetting agent consisting of at least one member of the group consisting of alkyl aryl sulfonate, alkyl aryl sodium sulfonate, lauryl sodium sulfate and a long chain product formed by condensing ethylene oxide on a polyoxypropylene base, and a phosphate having the capacity to dissolve said soaps and said organic matter and said phosphate being present in an amount up to about 20% of the wetting agent; and said composition being added in the amount of up to about one-half of 1% of the liquid in the sewage unit.

3. The process of claim 1 wherein a portion of said composition is added directly to said sewage unit in at least one of said septic tank, lateral and cesspool and a portion is added to a drain in advance of said sewage unit, and substantially adding after a period of about a week an additional small quantity of said composition to the drain.

4. A composition of matter consisting essentially of; an organic surface active wetting agent for increasing the rate of waste liquid flow through sewage units, said agent having the quality of being a solvent for solid organic matter including grease, fats and substances of animal and vegetable origin and lime and magnesium soaps, neutral pH and inertness to bacteria encountered in said sewage unit, said wetting agent consisting of at least one member of the group consisting of alkyl aryl sulfonate, alkyl aryl sodium sulfonate, lauryl sodium sulfate and a long chain product formed by condensing ethylene oxide on a polyoxypropylene base; and a sodium phosphate having a solvent action for said organic matter and the ability to retain lime and magnesium ions in solution, said sodium phosphate being present in an amount up to about 20% by weight.

5. The composition of claim 4 in which the sodium phosphate consists of tri-sodium phosphate and 30% tri-polyphosphate based upon the weight of said tri-sodium phosphate.

References Cited in the file of this patent

UNITED STATES PATENTS

| | | |
|---|---|---|
| 702,811 | McCoy | June 17, 1902 |
| 1,812,401 | Goulding | June 30, 1931 |
| 2,396,278 | Lind | Mar. 12, 1946 |
| 2,486,921 | Byerly | Nov. 1, 1949 |
| 2,509,261 | Carosella | May 30, 1950 |

OTHER REFERENCES

Condensed Chemical Dictionary (Rose), Rheinhold Pub. Corp., 4th ed., 1950, p. 702.

Surface Active Agents, Schwartz & Perry (1949), pub. by Interscience Publishers, Inc., N. Y., pp. 307, 308, and 326.